US012799293B2

(12) United States Patent
Yang et al.

(10) Patent No.: US 12,799,293 B2
(45) Date of Patent: *Nov. 17, 2026

(54) POLYOLEFIN FOAM BEADS AND PROCESS FOR PRODUCING THE SAME

(71) Applicant: Dow Global Technologies LLC, Midland, MI (US)

(72) Inventors: Yunfeng Yang, Shanghai (CN); Haiyang Yu, Shanghai (CN); Jozef J.I. Van Dun, Antwerp (BE); Bo Lyu, Zhejiang (CN)

(73) Assignee: Dow Global Technologies LLC, Midland, MI (US)

( * ) Notice: Subject to any disclaimer, the term of this patent is extended or adjusted under 35 U.S.C. 154(b) by 581 days.

This patent is subject to a terminal disclaimer.

(21) Appl. No.: 18/250,382

(22) PCT Filed: Dec. 14, 2020

(86) PCT No.: PCT/CN2020/136143

§ 371 (c)(1),
(2) Date: Apr. 25, 2023

(87) PCT Pub. No.: WO2022/126319

PCT Pub. Date: Jun. 23, 2022

(65) Prior Publication Data

US 2023/0391973 A1 Dec. 7, 2023

(51) Int. Cl.

*C08J 9/16* (2006.01)
*C08J 3/24* (2006.01)
*C08J 9/228* (2006.01)

(52) U.S. Cl.

CPC . *C08J 9/16* (2013.01); *C08J 3/24* (2013.01); *C08J 9/228* (2013.01); *C08J 2351/06* (2013.01)

(58) Field of Classification Search

CPC .......... C08J 9/16

See application file for complete search history.

(56) References Cited

U.S. PATENT DOCUMENTS

| | | | | |
|---|---|---|---|---|
| 5,605,937 | A | 2/1997 | Knaus | |
| 5,763,498 | A | 6/1998 | Knaus | |
| 5,883,145 | A * | 3/1999 | Hurley | C08J 9/04 525/70 |
| 5,939,180 | A | 8/1999 | Kobayashi et al. | |
| 2006/0199872 | A1* | 9/2006 | Prieto | C08J 9/00 521/142 |
| 2020/0140643 | A1 | 5/2020 | Takagi et al. | |
| 2020/0199349 | A1 | 6/2020 | Gopalan | |
| 2022/0332913 | A1* | 10/2022 | Yang | C08J 9/18 |

FOREIGN PATENT DOCUMENTS

| | | |
|---|---|---|
| CA | 2183261 | 6/1996 |
| EP | 3296350 | 3/2018 |
| WO | 2002068530 | 9/2002 |
| WO | 2021056406 | 4/2021 |

OTHER PUBLICATIONS

Office action from corresponding Japanese application: 2023-534734 dated Sep. 10, 2024.

PCT/CN2020/136143, International Search Report and Written Opinion with a mailing date of May 31, 2021.

* cited by examiner

*Primary Examiner* — Irina Krylova

(57) ABSTRACT

The present disclosure relates to polyolefin foam beads comprising one or more polyolefin interpolymers, wherein the foam bead has a gel content of higher than or equal to 80% and a tan delta at 1 rad/s of lower or equal to 0.11 and a process for producing the same. The present disclosure further relates to an element prepared from the foam beads, a product comprising the element, and use of the foam beads in bead-filling applications.

4 Claims, 2 Drawing Sheets

CE1 (non-XL, gel 0%)

CE3 (Pre-XL, gel 44.5%)

CE6 (Pre-XL, gel 69.6%)

IE9 (Pre-XL, gel 95.5%)

POLYOLEFIN FOAM BEADS AND PROCESS FOR PRODUCING THE SAME

FIELD OF THE DISCLOSURE

The present disclosure relates to polyolefin foam beads and a process for producing the same. The present disclosure further relates to an element prepared from the foam beads, a product comprising the element, and use of the foam beads in bead-filling applications.

BACKGROUND

Polyolefin products, e.g., ENGAGE™ Polyolefin Elastomers (POE) and INFUSE™ Olefin Block Copolymers (OBC), find wide use in industry. For example, in the footwear industry, components such as midsoles are traditionally manufactured with crosslinked EVA/POE and EVA/OBC foams produced via chemical foaming. Such process, however, is very labor intensive, and thus alternative foaming technology with environmental and cost-saving process is pursued.

Bead foaming technology, a type of physical foaming, provides an option. The advantages of bead foaming compared to chemical foaming include: no uncomfortable odor, less contamination to molds, different visual and touch perception, isotropic properties of parts. Most importantly, the bead foaming process decouples the foaming process from the molding process.

Typically, there are two types of commercial use of bead foam in the footwear industry, represented by Adidas Boost (TPU) and Nike Joyride, respectively. The former involves bead production and steam-chest molding, while the latter involves bead production and filling of separate beads in a cavity to form an element (for example, a midsole). To ensure good sintering during steam-chest molding, the foamed beads should not be crosslinked, or can only be partially crosslinked with a relatively low level of gel content. For the bead-filling application (not only in footwear, but also in other applications, such as saddles, pillows and the like), the foamed beads are allowed to be crosslinked and thus can have relatively good elasticity.

There still exists a need for foamed beads having improved properties such as elasticity.

SUMMARY OF THE DISCLOSURE

In an aspect, the present disclosure provides a foam bead formed from a composition comprising one or more polyolefin interpolymers, wherein the foam bead has a gel content of higher than or equal to 80%, and a tan δ at 1 rad/s of lower than or equal to 0.11.

In a further aspect, the present disclosure provides a method for producing polyolefin foam beads, comprising, (a) providing a composition comprising one or more polyolefin interpolymers;
(b) pelletizing the composition to form pellets;
(c) crosslinking the pellets to a gel content of higher than or equal to 80%; and
(d) foaming the crosslinked pellets into foam beads, wherein the foam beads has a tan δ at 1 rad/s of lower than or equal to 0.11.

In a further aspect, the present disclosure provides an element prepared from a plurality of the foam beads as described herein, comprising a cavity filled with the foam beads.

In a further aspect, the present disclosure provides a product comprising the element as described herein.

In a further aspect, the present disclosure provides use of the foam beads as described herein in bead-filling applications.

It is to be understood that both the foregoing general description and the following detailed description are exemplary and explanatory only and are not restrictive of the invention, as claimed.

DETAILED DESCRIPTION OF THE DISCLOSURE

Figure 1:
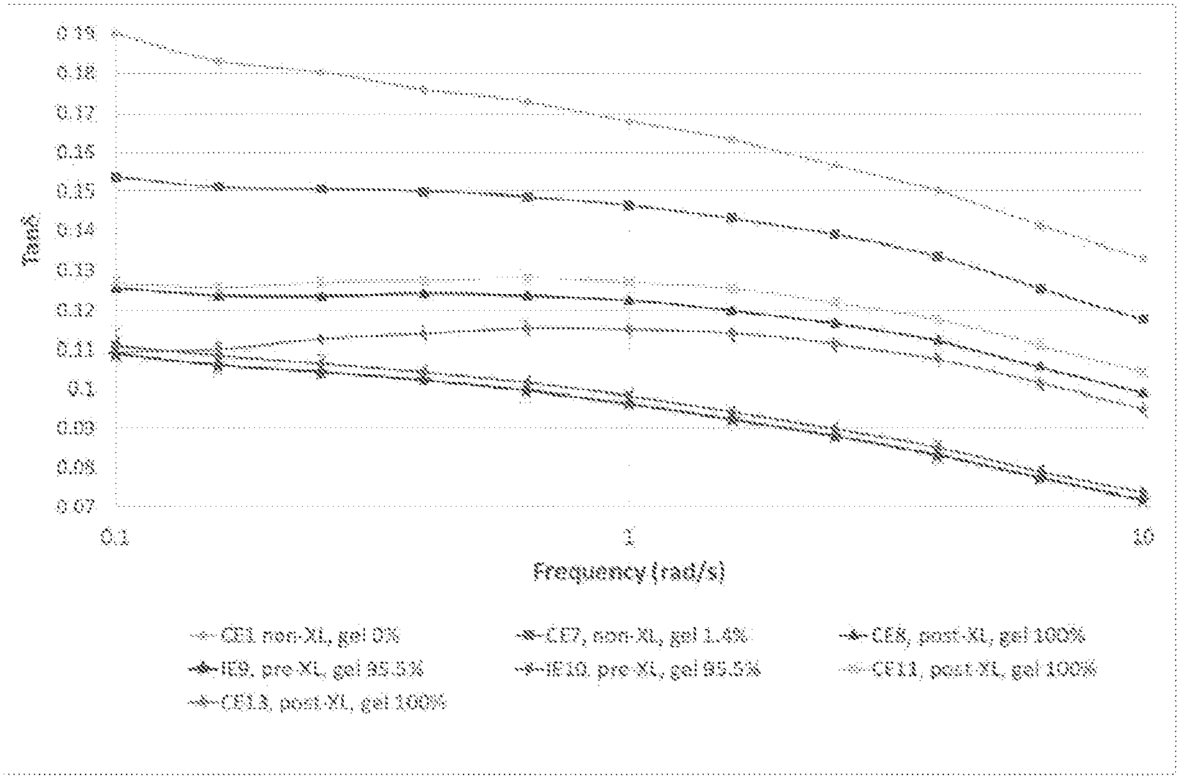
FIG. 1 is a graph showing the Tan δ of various foamed beads during Frequency sweep.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

The following detailed description refers to the accompanying drawings that show, by way of illustration, specific details and embodiments in which the invention may be practiced. Other embodiments may be utilized and changes may be made without departing from the scope of the invention. The various embodiments are not necessarily mutually exclusive, as some embodiments can be combined with one or more other embodiments to form new embodiments.

In the context of various embodiments, the articles "a", "an" and "the" as used with regard to a feature or element include a reference to one or more of the features or elements. All ranges include endpoints unless otherwise indicated.

As disclosed herein, the terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed.

As disclosed herein, all percentages mentioned herein are by weight, and temperatures in ° C., unless specified otherwise.

A. Polyolefin Foam Bead

The present disclosure provides a polyolefin interpolymer foam bead. The foam bead is formed from a composition comprising one or more polyolefin interpolymers.

In some embodiments, the foam bead can be formed from a composition comprising one or more polyolefin interpolymers, and optionally, one or more additives.

In some specific embodiments, the foam bead can be formed from a composition comprising one or more polyolefin interpolymers wherein no less than 70 wt % of the one or more polyolefin interpolymers is silane-grafted.

In some specific embodiments, the foam bead can be formed from a composition comprising: (A) one or more polyolefin interpolymers, and (B) one or more optional additives, wherein no less than 70 wt % of the one or more polyolefin interpolymers is silane-grafted.

i. Polyolefin Interpolymer

The term "polyolefin" or "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to polymer prepared by the polymerization of at least two different types of monomers. The term interpolymer thus includes the term copolymer (employed to refer to polymers prepared from two different types of monomers) and polymers prepared from more than two different types of monomers.

In some embodiments, the composition can comprise no less than 80 wt %, no less than 85 wt %, no less than 90 wt %, no less than 95 wt %, no less than 98 wt %, no less than 99 wt %, or 100 wt % of the polyolefin interpolymer, based on the total weight of the composition, or further based on the total weight of the foam bead. In some embodiments, the composition can comprise from 80 wt %, or 85 wt %, or 90 wt %, to 95 wt %, or 98 wt %, or 99 wt % or 100 wt %, of the polyolefin interpolymer, based on the total weight of the composition, or further based on the total weight of the foam bead.

In an embodiment, the polyolefin interpolymer can have a melt index (MI) of no greater than 30 g/10 min, no greater than 20 g/10 min, no greater than 10 g/10 min, or no greater than 5 g/10 min. In an embodiment, the polyolefin interpolymer can have a MI that is within the numerical range obtained by combining any two of the following end points: 0.1 g/10 min, 0.5 g/10 min, 0.8 g/10 min, 1.0 g/10 min, 1.5 g/10 min, 2.0 g/10 min, 5 g/10 min, 10 g/10 min, 20 g/10 min, and 30 g/10 min. In an embodiment, the polyolefin interpolymer can have a MI of from 0.1 g/10 min, or 0.5 g/10 min, or 0.8 g/10 min, to 1.0 g/10 min, or 1.5 g/10 min, or 2.0 g/10 min, or 5 g/10 min, or 10 g/10 min, or 20 g/10 min, or 30 g/10 min. In an embodiment, the polyolefin interpolymer can have a MI of from 0.1 g/10 min to 30 g/10 min, or from 0.1 g/10 min to 20 g/10 min, or from 0.1 g/10 min to 10 g/10 min, or from 0.5 g/10 min to 8 g/10 min, or from 1 g/10 min to 5 g/10 min.

In an embodiment, the polyolefin interpolymer can have a density of no less than 0.850 g/cm$^3$, no less than 0.855 g/cm$^3$, no less than 0.860 g/cm$^3$, no less than 0.865 g/cm$^3$, or no less than 0.870 g/cm$^3$. In an embodiment, the polyolefin interpolymer can have a density that is within the numerical range obtained by combining any two of the following end points: 0.850 g/cm$^3$, 0.855 g/cm$^3$, 0.860 g/cm$^3$, 0.865 g/cm$^3$, 0.870 g/cm$^3$, 0.875 g/cm$^3$, 0.880 g/cm$^3$, 0.885 g/cm$^3$, 0.890 g/cm$^3$, 0.895 g/cm$^3$, 0.900 g/cm$^3$, 0.905 g/cm$^3$, and 0.910 g/cm$^3$. In an embodiment, the polyolefin interpolymer can have a density of from 0.850 g/cm$^3$, or 0.855 g/cm$^3$, or 0.860 g/cm$^3$, or 0.865 g/cm$^3$, or 0.870 g/cm$^3$, or 0.875 g/cm$^3$, to 0.880 g/cm$^3$, or 0.885 g/cm$^3$, or 0.890 g/cm$^3$, or 0.895 g/cm$^3$, or 0.900 g/cm$^3$, or 0.905 g/cm$^3$, or 0.910 g/cm$^3$.

In an embodiment, the polyolefin interpolymer can have a density of from 0.850 g/cm$^3$ to 0.910 g/cm$^3$, from 0.855 g/cm$^3$ to 0.910 g/cm$^3$, from 0.860 g/cm$^3$ to 0.910 g/cm$^3$, from 0.865 g/cm$^3$ to 0.905 g/cm$^3$, or from 0.870 g/cm$^3$ to 0.905 g/cm$^3$.

In an embodiment, the polyolefin interpolymer can have a Shore A hardness of no less than 30, no less than 35, no less than 40, no less than 45, or no less than 50. In an embodiment, the polyolefin interpolymer can have a Shore A hardness that is within the numerical range obtained by combining any two of the following end points: 30, 35, 40, 45, 50, 55, 60, 65, 70, 75, 80, 85, and 90. In an embodiment, the polyolefin interpolymer can have a Shore A hardness of from 30, or 35, or 40, or 45, or 50, or 55 or 60, or 65, or 70, or 75, to 80, or 85 or 90. In an embodiment, the polyolefin interpolymer can have a Shore A hardness of from 30 to 90, from 35 to 90, from 40 to 90, from 45 to 90, from 50 to 90, or from 55 to 90.

In some embodiments, the polyolefin interpolymer can be a polyolefin elastomer (POE). In some embodiments, the polyolefin interpolymer can be selected from the group consisting of one or more ethylene/α-olefin multi-block interpolymers, one or more ethylene/α-olefin random copolymers, and any combination thereof.

(1) Ethylene α-Olefin Multi-Block Interpolymer

In some embodiments, the polyolefin interpolymer can comprise an ethylene/α-olefin multi-block interpolymer. In some embodiments, the polyolefin interpolymer can comprise an ethylene/α-olefin multi-block copolymer, for example, an ethylene/$C_3$-$C_{20}$ α-olefin multi-block copolymer, consisting of ethylene and one or more copolymerizable $C_3$-$C_{20}$ α-olefin comonomers in polymerized form (and optional additives). Non-limiting examples of suitable α-olefins include 1-propylene, 1-butene, 1-pentene, 1-hexene, 1-heptene, 1-octene, 1-nonene, 1-decene, 1-undecene, 1-dodecene, 1-tridecylene, and 1-tetradecene. In some exemplary embodiments, the α-olefin can be a $C_3$-$C_{10}$ α-olefin, for example a $C_4$-$C_8$ α-olefin. In an exemplary embodiment, the polyolefin interpolymer can comprise an ethylene/octene multi-block copolymer. In an exemplary embodiment, the ethylene/octene multi-block copolymer is commercially available under the tradename INFUSE™, from The Dow Chemical Company, Midland, Michigan, USA.

The term "ethylene/α-olefin multi-block interpolymer" or "olefin block copolymer (OBC)," as used herein, refers to an interpolymer that includes ethylene and one or more copolymerizable α-olefin comonomers in polymerized form, characterized by multiple blocks or segments of two or more (preferably three or more) polymerized monomer units, the blocks or segments differing in chemical or physical properties. Specifically, this term refers to a polymer comprising two or more (preferably three or more) chemically distinct regions or segments (referred to as "blocks") joined in a substantially linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), region-regularity or region-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalyst systems. Non-limiting examples of the olefin block copolymers of the present disclosure, as well as the processes for preparing the same, are disclosed in U.S. Pat. Nos. 7,858,706 B2, 8,198,374 B2, 8,318,864 B2, 8,609,779 B2, 8,710,143 B2, 8,785,551 B2, and 9,243,090 B2, which are all incorporated herein by reference in their entirety.

Illustratively, the multi-block copolymers can be represented by the following formula: $(AB)_n$, where n is at least 1, preferably an integer greater than 1, such as 2, 3, 4, 5, 10, 15, 20, 30, 40, 50, 60, 70, 80, 90, 100, or higher. Here, "A" represents a hard block or segment, and "B" represents a soft block or segment. Preferably the A segments and the B segments are linked in a substantially linear fashion, as opposed to a substantially branched or substantially star-shaped fashion. In other embodiments, the A segments and the B segments are randomly distributed along the polymer chain. In other words, for example, the block copolymers usually do not have a structure as follows: AAA-AA-BBB-BB. In still other embodiments, the block copolymers do not usually have a third type of block or segment, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The olefin block copolymers, in general, are produced via a chain shuttling process, such as, for example, described in U.S. Pat. No. 7,858,706, which is herein incorporated by reference. Some chain shuttling agents and related information are listed in Col. 16, line 39, through Col. 19, line 44. Some catalysts are described in Col. 19, line 45, through Col. 46, line 19, and some co-catalysts in Col. 46, line 20, through Col. 51 line 28. Some process features are described in Col 51, line 29, through Col. 54, line 56. See also the following: U.S. Pat. Nos. 7,608,668; 7,893,166; and 7,947,793 as well as U.S. Patent Publication 2010/0197880. See also U.S. Pat. No. 9,243,173.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block interpolymer comprising the $C_4$-$C_8$ α-olefin comonomer. Preferably, the $C_4$-$C_8$ α-olefin comonomer may be selected from 1-butene, 1-hexene, and 1-octene. In an embodiment, the ethylene/α-olefin multi-block interpolymer contains from 50 wt %, or 60 wt %, or 65 wt % to 80 wt %, or 85 wt %, or 90 wt % ethylene. For many ethylene/octene multi-block interpolymers, the composition comprises an ethylene content greater than 80 wt % of the whole ethylene/octene multi-block interpolymer and an octene content of from 10 wt % to 15 wt %, or from 15 wt % to 20 wt % of the whole ethylene/octene multi-block interpolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, or greater than 10 wt %, or greater than 15 wt %, based on the weight of the polymer. In an embodiment, the comonomer content in the soft segments is greater than 20 wt %, or greater than 25 wt %, or greater than 30 wt %, or greater than 35 wt %, or greater than 40 wt %, or greater than 45 wt %, or greater than 50 wt %, or greater than 60 wt % and can be up to 100 wt %.

The soft segments can be present in an ethylene/α-olefin multi-block interpolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block interpolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

Suitable ethylene/α-olefin multi-block interpolymer can be INFUSE™ from Dow, such as INFUSE™ D9130.05.

(2) Ethylene α-Olefin Random Copolymer

In some embodiments, the polyolefin interpolymer can comprise an ethylene/α-olefin random interpolymer. An ethylene/α-olefin random copolymer can be an ethylene/propylene random copolymer or an ethylene/$C_4$-$C_8$ α-olefin random copolymer. In an embodiment, the ethylene/α-olefin copolymer can be an ethylene/$C_4$-$C_8$ α-olefin copolymer. The ethylene/$C_4$-$C_8$ α-olefin copolymer is composed of, or otherwise consists of, ethylene and one copolymerizable $C_4$-$C_8$ α-olefin comonomer in polymerized form. The $C_4$-$C_8$ α-olefin comonomer may be selected from 1-butene, 1-hexene, and 1-octene.

Suitable ethylene/α-olefin random copolymer can be ENGAGE™ from Dow, such as ENGAGE™ 8150, or ENGAGE™ 7467.

ii Silane-Grafted Polyolefin Interpolymer

At least a part of the polyolefin interpolymer comprised in the composition for forming the foam bead as described can be silane-grafted. In other words, the composition can comprise a silane-grafted polyolefin interpolymer that is formed using the polyolefin interpolymer as described grafted with a silane monomer. In some exemplary embodiments, the silane-grafted polyolefin interpolymer can be a silane-grafted ethylene/$C_3$-$C_{20}$ $\alpha$-olefin multi-block copolymer, for example, a silane-grafted ethylene/$C_3$-$C_{10}$ $\alpha$-olefin multi-block copolymer. In another exemplary embodiment, the silane-grafted polyolefin interpolymer can be a silane-grafted ethylene/$\alpha$-olefin random copolymer, for example, a silane-grafted ethylene/$C_4$-$C_8$ $\alpha$-olefin random copolymer.

The "silane monomer" employed to functionalize the polyolefin interpolymer is a silane-containing monomer that can be grafted to the polyolefin interpolymer to form a silane-functionalized polyolefin interpolymer, and is capable of crosslinking the polyolefin interpolymer. In some embodiments, the silane monomer can be a hydrolysable silane monomer. Non-limiting examples of suitable hydrolysable silane monomer include vinyltrimethoxysilane (VTMS), vinyltriethoxysilane (VTES), vinyltriacetoxysilane, and gamma-(meth)acryloxy propyl trimethoxy silane. In an exemplary embodiment, the hydrolysable silane monomer can be VTMS.

The silane-grafted polyolefin interpolymer can be formed by a process such as the Sioplas process, in which a hydrolysable silane monomer (such as a vinyl silane monomer) is grafted onto the backbone of the polyolefin interpolymer. The hydrolysable silane monomer may be grafted to the polyolefin interpolymer by the use of a suitable quantity of organic peroxide, such as 2,5-dimethyl-2,5-di-(tert-butylperoxy) hexane, to form a silane-grafted polyolefin interpolymer.

In some embodiments, the silane-grafted polyolefin interpolymer can comprise a silane grafting ratio of higher than 0.3 wt %, higher than 0.5 wt %, higher than 0.6 wt %, higher than 0.8 wt %, or higher than 1.0 wt %, based on the total weight of the silane-grafted polyolefin interpolymer. In some embodiments, the silane-grafted polyolefin interpolymer can comprise a silane grafting ratio of from 0.1 wt %, or 0.3 wt %, or 0.5 wt %, or 0.6 wt %, or 0.8 wt %, or 1.0 wt %, to 1.1 wt %, or 1.2 wt %, or 1.5 wt %, or 1.8 wt %, or 2.0 wt %, or 2.5 wt % or 3.0 wt % or 4.0 wt %, or 5.0 wt %, based on the total weight of the silane-grafted polyolefin interpolymer. In some embodiments, the silane-grafted polyolefin interpolymer can comprise a silane grafting ratio of from 0.1 wt % to 5.0 wt %, from 0.3 wt % to 4.0 wt %, or from 0.5 wt % to 3.0 wt %, based on the total weight of the silane-grafted polyolefin interpolymer. As used herein, the term "silane grafting ratio" refers to the ratio of the weight of silane grafted on the silane-grafted polyolefin interpolymer to the total weight of the silane-grafted polyolefin interpolymer.

In some embodiments, the foam bead can be formed from a composition comprising no less than 70 wt %, no less than 75 wt %, no less than 80 wt %, no less than 85 wt %, no less than 90 wt %, no less than 95 wt %, no less than 98 wt %, no less than 99 wt %, or 100 wt % of the silane-grafted polyolefin interpolymer, based on the total weight of the polyolefin interpolymer(s) comprised in the composition. In some embodiments, the foam bead can be formed from a composition comprising from 70 wt %, or 75 wt %, or 80 wt %, or 85 wt %, to 90 wt %, or 95 wt %, or 98 wt %, or 99 wt %, or 100 wt %, of the silane-grafted polyolefin interpolymer, based on the total weight of the polyolefin interpolymer(s) comprised in the composition. In some embodiments, the foam bead can be formed from a composition comprising 100 wt % of the silane-grafted polyolefin interpolymer, based on the total weight of the polyolefin interpolymer(s) comprised in the composition.

The silane-grafted polyolefin interpolymers are useful for crosslinking by silane chemistry. It is understood that the crosslinking can be carried out in other ways rather than silane chemistry, for example, electron beam irradiation, gamma irradiation, or free radical chemistry based crosslinking.

iii Non-Silane-Grafted Polyolefin Interpolymer

The composition for forming the foam bead comprising a silane-grafted polyolefin interpolymer as described above can comprise a non-silane-grafted polyolefin interpolymer. As used herein, "a non-silane-grafted polyolefin interpolymer" refers to one or more polyolefin interpolymers comprised in the composition for forming the foam bead in addition to the silane-grafted polyolefin interpolymer as described above.

The non-silane-grafted polyolefin interpolymer may comprise any polyolefin interpolymer described herein that is not grafted with silane. The non-silane-grafted polyolefin interpolymer is different than the silane-grafted polyolefin interpolymer as described above at least because the non-silane-grafted polyolefin interpolymer is not silane-functionalized or -grafted.

In the embodiments, the non-silane-grafted polyolefin interpolymer and the polyolefin interpolymer that is used to form the silane-grafted polyolefin interpolymer can be physically, and/or compositionally and/or structurally, the same or different.

In some embodiments, the foam bead can be formed from a composition comprising no more than 30 wt %, no more than 25 wt %, no more than 20 wt %, no more than 15 wt %, no more than 10 wt %, no more than 5 wt %, no more than 3 wt %, no more than 2 wt %, or no more than 1 wt %, or 0 wt %, of the non-silane-grafted polyolefin interpolymer, based on the total weight of the polyolefin interpolymer(s) comprised in the composition. In some embodiments, the foam bead can be formed from a composition comprising from 0 wt %, or 1 wt %, or 2 wt %, or 3 wt %, or 5 wt %, to 10 wt %, or 15 wt %, or 20 wt %, or 25 wt %, or 30 wt %, of the non-silane-grafted polyolefin interpolymer, based on the total weight of the polyolefin interpolymer(s) comprised in the composition. In some embodiments, the foam bead can be formed from a composition that is free of a non-silane-grafted polyolefin interpolymer.

In some embodiments, the non-silane-grafted polyolefin interpolymer can be a non-modified polyolefin interpolymer. Examples of suitable non-modified polyolefin interpolymer include ethylene or propylene random/block copolymers, such as INFUSE™, ENGAGE™, VERSIFY™ and etc.

In some embodiments, the composition for forming the foam bead may further comprise polyolefin derivatives such as ethylene vinyl acetate (EVA) copolymer of high VA content (for example, having a VA content of higher than 18 wt %, based on the total weight of the EVA). Suitable examples of the EVA copolymer include ELVAX® 460, ELVAX® 360, ELVAX® 265, ELVAX® 260, ELVAX® 250, ELVAX® 40L-03.

iv. Additives

The composition may include one or more optional additives. Non-limiting examples of suitable additives include nucleation agent, cell size stabilizer, antioxidants, coloring agents, inorganic fillers, flow aids, viscosity control agents, and combinations thereof.

In an embodiment, the foam bead is formed from a composition comprising from 0 wt %, or 0.01 wt % to 0.3 wt %, or 0.5 wt %, or 1 wt %, or 2 wt %, or 3 wt %, or 5 wt % of one or more optional additives, based on the total weight of the composition, or further based on the total weight of the foam bead. In another embodiment, the foam bead is formed from a composition containing from 0 wt % to 5 wt %, or from 0 wt % to 1 wt %, or from 0.01 wt % to 5 wt % optional additive, based on the total weight of the composition, or further based on the total weight of the foam bead.

v. Foam Bead

The foam bead of the present application can be formed from a composition comprising one or more polyolefin interpolymers, and optionally, one or more additives. In some embodiments, the foam bead can be formed from a composition comprising, from 80 wt %, or 85 wt %, 90 wt %, to 95 wt %, or 98 wt %, or 99 wt % or 100 wt %, of the polyolefin interpolymer as described herein, based on the total weight of the composition, or further based on the total weight of the foam bead, and from 0 wt %, or 0.01 wt % to 0.3 wt %, or 0.5 wt %, or 1 wt %, or 2 wt %, or 3 wt %, or 5 wt % of one or more optional additives, based on the total weight of the composition, or further based on the total weight of the foam bead.

In some specific embodiments, the foam bead of the present application can be formed from a composition comprising one or more polyolefin interpolymers wherein no less than 70 wt % of the one or more polyolefin interpolymers is silane-grafted.

In some embodiments, the composition can comprise, optionally, one or more optional additives.

In some embodiments, the foam bead can be formed from a composition comprising:

(A) from 80 wt %, or 85 wt %, or 90 wt %, to 95 wt %, or 98 wt %, or 99 wt % or 100 wt %, of one or more polyolefin interpolymers, based on the total weight of the composition, or further the total weight of the foam bead; and, (B) optionally, from 0 wt %, or 0.01 wt % to 0.3 wt %, or 0.5 wt %, or 1 wt %, or 2 wt %, or 3 wt %, or 5 wt %, of one or more optional additives, based on the total weight of the composition, or further the total weight of the foam bead;

wherein the one or more polyolefin interpolymers comprise from 70 wt %, or 75 wt %, or 80 wt %, or 85 wt %, to 90 wt %, or 95 wt %, or 98 wt %, or 99 wt %, or 100 wt %, of one or more silane-grafted polyolefin interpolymers, based on total weight of the polyolefin interpolymer(s) comprised in the composition; and, from 0 wt %, or 1 wt %, or 2 wt %, or 3 wt %, or 5 wt %, to 10 wt %, or 15 wt %, or 20 wt %, or 25 wt %, or 30 wt %, of one or more non-silane-grafted polyolefin interpolymers, based on the total weight of the polyolefin interpolymer(s) comprised in the composition.

In some embodiments, the foam bead can have a gel content of higher than or equal to 80%, higher than or equal to 85%, or higher than or equal to 90%. In some embodiments, the foam bead can have a gel content of from 80%, or 85%, to 90%, or 95%, or 98%, or 99% or 100%.

In some embodiments, the foam bead can be formed from the pellets of the composition as described. In some embodiments, the foam bead can be formed from the crosslinked pellets of the composition as described. In some embodiments, the crosslinked pellets of the composition can have a gel content of higher than or equal to 80%, higher than or equal to 85%, or higher than or equal to 90%. In some embodiments, the crosslinked pellets can have a gel content of from 80%, or 85%, to 90%, or 95%, or 98%, or 99% or 100%. In some embodiments, the foam bead is formed from the composition as described above by crosslinking the pellets of the composition prior to foaming the pellets. In some embodiments, the foam bead is formed by foaming the crosslinked pellets of the composition as described above.

In some embodiments, the foam bead can have a foam density of less than 0.20 g/cc. In some embodiments, the foam bead has a foam density of from 0.06 g/cc, or 0.07 g/cc, or 0.08 g/cc, or 0.09 g/cc, or 0.10 g/cc, or 0.11 g/cc, or 0.12 g/cc, or 0.13 g/cc, to 0.14 g/cc, or 0.15 g/cc, or 0.16 g/cc, or 0.17 g/cc, or 0.18 g/cc, or 0.19 g/cc, or 0.20 g/cc. In some embodiments, the foam bead can have a foam density of from 0.06 g/cc to 0.20 g/cc, from 0.08 g/cc to 0.18 g/cc, from 0.10 g/cc to 0.17 g/cc, or from 0.12 g/cc to 0.16 g/cc.

In some embodiments, the foam bead can have a tan δ at 0.1 rad/s of lower than or equal to 0.16, lower than or equal to 0.15, lower than or equal to 0.14, lower than or equal to 0.13, or lower than or equal to 0.12. In some embodiments, the foam bead can have a tan δ at 1 rad/s of lower than or equal to 0.15, lower than or equal to 0.14, lower than or equal to 0.13, lower than or equal to 0.12, lower than or equal to 0.11, or lower than or equal to 0.10. In some embodiments, the foam bead can have a tan δ at 10 rad/s of lower than or equal to 0.12, lower than or equal to 0.11, lower than or equal to 0.10, lower than or equal to 0.09, or lower than or equal to 0.08.

In some embodiments, the foam bead can have an average cell size of less than about 100 μm. In some embodiments, the foam bead can have an average cell size of from about 10 μm, about 15 μm, about 20 μm, to 80 μm, or 85 μm, or 90 μm, or 95 μm, or 100 μm.

In some embodiments, the foam bead can be prepared by using the method for producing polyolefin foam beads as described below.

B. Method for Producing Polyolefin Foam Beads

The present disclosure provides a method for producing polyolefin foam beads, comprising, (a) providing a composition comprising one or more polyolefin interpolymers;

(b) pelletizing the composition to form pellets;

(c) crosslinking the pellets to a gel content of higher than or equal to 80%; and (d) foaming the crosslinked pellets into foam beads, wherein the foam beads has a tan δ at 1 rad/s of lower than or equal to 0.11.

i. Polyolefin Composition

The method for producing polyolefin foam beads as described herein comprises (a) providing a composition comprising one or more polyolefin interpolymers, which composition can also be referred to herein as "the composition" or "the polyolefin composition".

In some embodiments, the composition provided herein can comprise one or more polyolefin interpolymers (for example, one or more of those described in the "Polyolefin Foam Bead" portion above), and optionally, one or more additives.

In some embodiments, the composition can comprise no less than 80 wt %, no less than 85 wt %, no less than 90 wt %, no less than 95 wt %, no less than 98 wt %, no less than 99 wt % or 100 wt % of the polyolefin interpolymer, based on the total weight of the composition. In some embodiments, the composition can comprise from 80 wt %, or 85 wt %, or 90 wt %, to 95 wt %, or 98 wt %, or 99 wt % or 100 wt %, of the polyolefin interpolymer, based on the total weight of the composition.

In an embodiment, the polyolefin interpolymer can have a melt index (MI) of no greater than 30 g/10 min, no greater than 20 g/10 min, no greater than 10 g/10 min, or no greater than 5 g/10 min. In an embodiment, the polyolefin interpolymer can have a MI that is within the numerical range obtained by combining any two of the following end points: 0.1 g/10 min, 0.5 g/10 min, 0.8 g/10 min, 1.0 g/10 min, 1.5 g/10 min, 2.0 g/10 min, 5 g/10 min, 10 g/10 min, 20 g/10 min, and 30 g/10 min. In an embodiment, the polyolefin interpolymer can have a MI of from 0.1 g/10 min, or 0.5 g/10 min, or 0.8 g/10 min, to 1.0 g/10 min, or 1.5 g/10 min, or 2.0 g/10 min, or 5 g/10 min, or 10 g/10 min, or 20 g/10 min, or 30 g/10 min. In an embodiment, the polyolefin interpolymer can have a MI of from 0.1 g/10 min to 30 g/10 min, or from 0.1 g/10 min to 20 g/10 min, or from 0.1 g/10 min to 10 g/10 min, or from 0.5 g/10 min to 8 g/10 min, or from 1 g/10 min to 5 g/10 min.

In an embodiment, the polyolefin interpolymer can have a density of no less than 0.850 $g/cm^3$, no less than 0.855 $g/cm^3$, no less than 0.860 $g/cm^3$, no less than 0.865 $g/cm^3$, or no less than 0.870 $g/cm^3$. In an embodiment, the polyolefin interpolymer can have a density that is within the numerical range obtained by combining any two of the following end points: 0.850 $g/cm^3$, 0.855 $g/cm^3$, 0.860 $g/cm^3$, 0.865 $g/cm^3$, 0.870 $g/cm^3$, 0.875 $g/cm^3$, 0.880 $g/cm^3$, 0.885 $g/cm^3$, 0.890 $g/cm^3$, 0.895 $g/cm^3$, 0.900 $g/cm^3$, 0.905 $g/cm^3$, and 0.910 $g/cm^3$. In an embodiment, the polyolefin interpolymer can have a density of from 0.850 $g/cm^3$, or 0.855 $g/cm^3$, or 0.860 $g/cm^3$, or 0.865 $g/cm^3$, or 0.870 $g/cm^3$, or 0.875 $g/cm^3$, to 0.880 $g/cm^3$, or 0.885 $g/cm^3$, or 0.890 $g/cm^3$, or 0.895 $g/cm^3$, or 0.900 $g/cm^3$, or 0.905 $g/cm^3$, or 0.910 $g/cm^3$. In an embodiment, the polyolefin interpolymer can have a density of from 0.850 $g/cm^3$ to 0.910 $g/cm^3$, from 0.855 $g/cm^3$ to 0.910 $g/cm^3$, from 0.860 $g/cm^3$ to 0.910 $g/cm^3$, from 0.865 $g/cm^3$ to 0.905 $g/cm^3$, or from 0.870 $g/cm^3$ to 0.905 $g/cm^3$.

In an embodiment, the polyolefin interpolymer can have a Shore A hardness of no less than 30, no less than 35, no less than 40, no less than 45, or no less than 50. In an embodiment, the polyolefin interpolymer can have a Shore A hardness that is within the numerical range obtained by combining any two of the following end points: 30, 35, 40, 45, 50, 55, 60, 65, 70, 75, 80, 85, and 90. In an embodiment, the polyolefin interpolymer can have a Shore A hardness of from 30, or 35, or 40, or 45, or 50, or 55 or 60, or 65, or 70, or 75, to 80, or 85 or 90. In an embodiment, the polyolefin interpolymer can have a Shore A hardness of from 30 to 90, from 35 to 90, from 40 to 90, from 45 to 90, from 50 to 90, or from 55 to 90.

In some embodiments, the polyolefin interpolymer can be a polyolefin elastomer (POE). In some embodiments, the polyolefin interpolymer can be selected from the group consisting of ethylene/α-olefin multi-block interpolymer, ethylene/α-olefin random copolymer, and the combination thereof.

In some embodiments, the polyolefin interpolymer can comprise an ethylene/α-olefin multi-block interpolymer. In some embodiments, the polyolefin interpolymer can comprise an ethylene/α-olefin multi-block copolymer, for example, an ethylene/$C_3$-$C_{20}$ α-olefin multi-block copolymer, consisting of ethylene and one or more copolymerizable $C_3$-$C_{20}$ α-olefin comonomers in polymerized form (and optional additives). Non-limiting examples of suitable α-olefins include 1-propylene, 1-butene, 1-pentene, 1-hexene, 1-heptene, 1-octene, 1-nonene, 1-decene, 1-undecene, 1-dodecene, 1-tridecylene, and 1-tetradecene. In some exemplary embodiments, the α-olefin can be a $C_3$-$C_{10}$ α-olefin, for example a $C_4$-$C_8$ α-olefin. In an exemplary embodiment, the polyolefin interpolymer can comprise an ethylene/octene multi-block copolymer. In an exemplary embodiment, the ethylene/octene multi-block copolymer is commercially available under the tradename INFUSE™ from DOW.

Suitable ethylene/α-olefin multi-block interpolymer can be INFUSE™ from Dow, such as INFUSE™ D9130.05.

In some embodiments, the polyolefin interpolymer can comprise an ethylene/α-olefin random interpolymer. An ethylene/α-olefin random copolymer can be an ethylene/propylene random copolymer or an ethylene/$C_4$-$C_8$ α-olefin random copolymer. In an embodiment, the ethylene/α-olefin copolymer can be an ethylene/$C_4$-$C_8$ α-olefin copolymer. The ethylene/$C_4$-$C_8$ α-olefin copolymer is composed of, or otherwise consists of, ethylene and one copolymerizable $C_4$-$C_8$ α-olefin comonomer in polymerized form. The $C_4$-$C_8$ α-olefin comonomer may be selected from 1-butene, 1-hexene, and 1-octene.

Suitable ethylene/α-olefin random copolymer can be ENGAGE™ from Dow, such as ENGAGE™ 8150, or ENGAGE™ 7467.

In some embodiments, the composition provided herein can optionally comprise one or more additives. Non-limiting examples of suitable additives include nucleation agent, cell size stabilizer, antioxidants, coloring agents, inorganic fillers, flow aids, viscosity control agents, and combinations thereof.

In an embodiment, the composition can comprise from 0 wt %, or 0.01 wt % to 0.3 wt %, or 0.5 wt %, or 1 wt %, or 2 wt %, or 3 wt %, or 5 wt % of one or more optional additives, based on the total weight of the composition. In another embodiment, the composition can comprise from 0 wt % to 5 wt %, or from 0 wt % to 1 wt %, or from 0.01 wt % to 5 wt % optional additive, based on the total weight of the composition.

In some embodiments, the composition can comprise, from 80 wt %, or 85 wt %, or 90 wt %, to 95 wt %, or 98 wt %, or 99 wt % or 100 wt %, of the polyolefin interpolymer as described herein, based on the total weight of the composition, and, from 0 wt %, or 0.01 wt % to 0.3 wt %, or 0.5 wt %, or 1 wt %, or 2 wt %, or 3 wt %, or 5 wt %, of one or more optional additives, based on the total weight of the composition.

In some specific embodiments, the composition provided herein can comprise one or more polyolefin interpolymers wherein no less than 70 wt % of the one or more polyolefin interpolymers is silane-grafted.

In some specific embodiments, the composition provided herein can comprise, optionally, one or more optional additives.

In some embodiment, the composition can comprise a silane-grafted polyolefin interpolymer. The silane-grafted polyolefin interpolymer may comprise any polyolefin interpolymer as described herein that is further functionalized or grafted with a silane monomer.

In some exemplary embodiments, the silane-grafted polyolefin interpolymer can be an ethylene/$C_3$-$C_{20}$ α-olefin multi-block copolymer as described grafted with a silane monomer, i.e., a silane-grafted ethylene/$C_3$-$C_{20}$ α-olefin multi-block copolymer, for example, a silane-grafted ethylene/$C_3$-$C_{10}$ α-olefin multi-block copolymer. In another exemplary embodiment, the silane-grafted polyolefin interpolymer can be an ethylene/α-olefin random copolymer as described grafted with a silane monomer, i.e., a silane-grafted ethylene/α-olefin random copolymer, for example, a silane-grafted ethylene/$C_4$-$C_8$ α-olefin random copolymer. In some embodiments, the silane monomer can be a hydrolysable silane monomer. Non-limiting examples of suitable hydrolysable silane monomer include vinyltrimethoxysilane (VTMS), vinyltriethoxysilane (VTES), vinyltriacetoxysilane, and gamma-(meth)acryloxy propyl trimethoxy silane. In an exemplary embodiment, the hydrolysable silane monomer can be VTMS.

The silane-grafted polyolefin interpolymer can be formed by a process such as the Sioplas process, in which a hydrolysable silane monomer (such as a vinyl silane monomer) is grafted onto the backbone of the polyolefin interpolymer. The hydrolysable silane monomer may be grafted to the polyolefin interpolymer by the use of a suitable quantity of organic peroxide, such as 2,5-bis(tert-butylperoxy)-2,5-dimethylhexane, to form a silane-grafted polyolefin interpolymer.

In some embodiments, the silane-grafted polyolefin interpolymer can comprise a silane grafting ratio of higher than 0.3 wt %, higher than 0.5 wt %, higher than 0.6 wt %, higher than 0.8 wt %, or higher than 1.0 wt %, based on the total weight of the silane-grafted polyolefin interpolymer. In some embodiments, the silane-grafted polyolefin interpolymer can comprise a silane grafting ratio of from 0.1 wt %, or 0.3 wt %, or 0.5 wt %, or 0.6 wt %, or 0.8 wt %, or 1.0 wt %, to 1.1 wt %, or 1.2 wt %, or 1.5 wt %, or 1.8 wt %, or 2.0 wt %, or 2.5 wt % or 3.0 wt % or 4.0 wt %, or 5.0 wt %, based on the total weight of the silane-grafted polyolefin interpolymer. In some embodiments, the silane-grafted polyolefin interpolymer can comprise a silane grafting ratio of from 0.1 wt % to 5.0 wt %, from 0.3 wt % to 4.0 wt %, or from 0.5 wt % to 3.0 wt %, based on the total weight of the silane-grafted polyolefin interpolymer.

In an embodiment, the composition can comprise no less than 70 wt %, no less than 75 wt %, no less than 80 wt %, no less than 85 wt %, no less than 90 wt %, no less than 95 wt %, no less than 98 wt %, no less than 99 wt %, or 100 wt % of the silane-grafted polyolefin interpolymer, based on the total weight of the polyolefin interpolymer(s) comprised in the composition. In an embodiment, the composition can comprise from 70 wt %, or 75 wt %, or 80 wt %, or 85 wt %, to 90 wt %, or 95 wt %, or 98 wt %, or 99 wt %, or 100 wt %, of the silane-grafted polyolefin interpolymer, based on the total weight of the polyolefin interpolymer(s) comprised in the composition. In an embodiment, the composition can comprise 100 wt % of the silane-grafted polyolefin interpolymer, based on the total weight of the polyolefin interpolymer(s) comprised in the composition.

In some embodiments, the composition can comprise a non-silane-grafted polyolefin interpolymer.

The non-silane-grafted polyolefin interpolymer may comprise any polyolefin interpolymer described herein that is not grafted with silane. The non-silane-grafted polyolefin interpolymer is different than the silane-grafted polyolefin interpolymer as described above at least because the non-silane-grafted polyolefin interpolymer is not silane-functionalized or -grafted.

In the embodiments, the non-silane-grafted polyolefin interpolymer and the polyolefin interpolymer that is used to form the silane-grafted polyolefin interpolymer can be physically, and/or compositionally and/or structurally, the same or different.

In an embodiment, the composition can comprise no more than 30 wt %, no more than 25 wt %, no more than 20 wt %, no more than 15 wt %, no more than 10 wt %, no more than 5 wt %, no more than 3 wt %, no more than 2 wt %, or no more than 1 wt %, or 0 wt %, of the non-silane-grafted polyolefin interpolymer, based on the total weight of the polyolefin interpolymer(s) comprised in the composition. In an embodiment, the composition can comprise from a composition comprising from 0 wt %, or 1 wt %, or 2 wt %, or 3 wt %, or 5 wt %, to 10 wt %, or 15 wt %, or 20 wt %, or 25 wt %, or 30 wt %, of the non-silane-grafted polyolefin interpolymer, based on the total weight of the polyolefin interpolymer(s) comprised in the composition. In an embodiment, the composition can be free of a non-silane-grafted polyolefin interpolymer.

In some embodiments, the non-silane-grafted polyolefin interpolymer can be a non-modified polyolefin interpolymer. Examples of suitable non-modified polyolefin interpolymer include ethylene or propylene random/block copolymers, such as INFUSE™, ENGAGE™, VERSIFY™ and etc.

In some embodiments, the composition for forming the foam bead may further comprise polyolefin derivatives such as ethylene vinyl acetate (EVA) copolymers of high VA content (for example, having a VA content of higher than 18 wt %, based on the total weight of the EVA). Suitable examples of the EVA copolymer include ELVAX® 460, ELVAX® 360, ELVAX® 265, ELVAX® 260, ELVAX® 250, ELVAX® 40L-03.

In some embodiments, the composition can comprise one or more optional additives. The one or more additives optionally comprised in the composition can be those as described above.

In some embodiments, the composition can comprise:

(A) from 80 wt %, or 85 wt %, or 90 wt %, to 95 wt %, or 98 wt %, or 99 wt % or 100 wt %, of one or more polyolefin interpolymers, based on the total weight of the composition, or further the total weight of the foam bead; and, (B) optionally, from 0 wt %, or 0.01 wt % to 0.3 wt %, or 0.5 wt %, or 1 wt %, or 2 wt %, or 3 wt %, or 5 wt %, of one or more optional additives, based on the total weight of the composition, or further the total weight of the foam bead;

wherein the one or more polyolefin interpolymers comprise from 70 wt %, or 75 wt %, or 80 wt %, or 85 wt %, to 90 wt %, or 95 wt %, or 98 wt %, or 99 wt %, or 100 wt %, of one or more silane-grafted polyolefin interpolymers, based on total weight of the polyolefin interpolymer(s) comprised in the composition; and, from 0 wt %, or 1 wt %, or 2 wt %, or 3 wt %, or 5 wt %, to 10 wt %, or 15 wt %, or 20 wt %, or 25 wt %, or 30 wt %, of one or more non-silane-grafted polyolefin interpolymers, based on the total weight of the polyolefin interpolymer(s) comprised in the composition.

ii. Pelletization

The method for producing polyolefin foam beads as described herein comprises (b) pelletizing the composition to form pellets.

In some embodiments, the pellets (also referred to herein as "micro-pellets") can be substantially spherical. In some embodiments, the pellets can have a diameter of from 1.8 mm, or 2.0 mm, or 2.3 mm to 3.0 mm, or 3.5 mm, or 3.8 mm. In a specific embodiment, the pellets can have a diameter of from 2.3 mm to 3.0 mm.

In some embodiments, the pelletization can be carried out by using a pelletizer to produce pellets of the composition. In some embodiments, the pelletization can be carried out by underwater pelletization. Generally, underwater pelletization can be carried out by using an underwater pelletizer with a die plate generally having a plurality of cavity systems with a plurality of holes.

iii. Crosslinking

The method for producing polyolefin foam beads as described herein comprises (c) crosslinking the pellets.

In the method of the present disclosure, the step of crosslinking is carried out prior to the step of foaming.

In some embodiments, the crosslinking is carried out to a gel content of higher than or equal to about 80%, higher than or equal to about 85%, or higher than or equal to about 90%. In some embodiments, crosslinking can be carried out to a gel content of from about 80%, or about 85%, to about 90%, or about 95%, or about 98%, or about 99% or about 100%.

In some embodiments, the crosslinking can be carried out by methods using silane chemistry, electron beam irradiation, gamma irradiation, or free radical chemistry based crosslinking. In a specific embodiment, the crosslinking can be carried out by using silane chemistry, i.e., silane crosslinking.

In some embodiments, a crosslinking agent may be used for crosslinking the pellets of the composition. The crosslinking agent is not particularly limited, as far as the crosslinking agent can crosslink the copolymer. The crosslinking agent used may be a known organic peroxide used for crosslinking a polyethylene-based resin. Examples thereof include the Percumyl series compound, such as dicumyl peroxide and tert-butylcumyl peroxide, the Perbutyl series compound, such as 1,1-bis(tert-butylperoxy)-3,3,5-trimethylcyclohexane, 2,5-dimethyl-2,5-di(tert-butylperoxy)hexane, and di-tert-butyl peroxide, the Perhexyl series compound, such as tert-hexyl peroxybenzoate, and the Perocta series compound, such as 1,1,3,3-tetramethylbutyl peroxy-2-ethylhexanoate. These compounds may be used alone or as a combination of two or more kinds thereof. In some illustrative embodiments, the lower limit of the amount of one or more crosslinking agents mixed can be about 0.05 parts by weight, about 0.1 parts by weight, about 0.2 parts by weight, about 0.3 parts by weight, about 0.4 parts by weight, or about 0.5 parts by weight, per 100 parts by weight of the total weight of the polymer. The upper limit of the amount of one or more crosslinking agents mixed can be about 5.0 parts by weight, about 4.5 parts by weight, about 4.0 parts by weight, about 3.5 parts by weight, about 3.0 parts by weight, or about 2.5 parts by weight, per 100 parts by weight of the total weight of the polymer.

In some embodiments, the crosslinking can be carried out at a temperature of from about 20° C., or about 40° C., or about 60° C., or about 80° C., or about 100° C., to about 120° C., or about 150° C., or about 180° C., or about 200° C., or about 220° C.

In some embodiments, the crosslinking can be carried out by irradiation at a dose of, for example, from 30 KGy to 80 KGy, from 40 KGy to 70 KGy, or from 45 KGy to 60 KGy.

In an illustrative embodiment where silane crosslinking is utilized, the crosslinking can be carried out by soaking the pellets of the composition comprising a silane-grafted polyolefin interpolymer with a catalyst (for example, dibutyl tin dilaurate) or its silane solution and exposing the pellets to air for moisture crosslinking of the silane moieties.

In another illustrative embodiment where silane crosslinking is utilized, the crosslinking can be carried out by immersing the pellets of the composition comprising a silane-grafted polyolefin interpolymer in hot water (for example, at a temperature of higher than 80° C.) for moisture crosslinking of the silane moieties.

iv. Foaming

The method for producing polyolefin foam beads as described herein comprises (d) foaming the crosslinked pellets into foamed beads.

In the method of the present disclosure, the step of foaming is carried out after the step of crosslinking.

In some embodiments, the foaming can be a physical foaming.

In some embodiments, a blowing agent may be used for foaming the crosslinked pellets. The blowing agent used for foaming is not particularly limited, as far as the blowing agent can expand the crosslinked particles. Examples of the blowing agent include an inorganic physical blowing agent, such as air, nitrogen, carbon dioxide, argon, helium, oxygen, and neon, and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical blowing agent is preferred since it does not deplete the ozone layer and is inexpensive, nitrogen, air, and carbon dioxide are more preferred, and carbon dioxide is particularly preferred. The blowing agents may be used alone or as a combination of two or more kinds thereof. In some embodiments, the amount of the blowing agent used may be determined in consideration of the apparent density of the target expanded beads, the kind of the multi-block copolymer, the kind of the blowing agent, and the like, and is generally from about 2 to about 20 parts by weight for an organic physical blowing agent, and, from about 0.5 to about 20 parts by weight for an inorganic physical blowing agent, per 100 parts by weight of the total weight of the polymer.

In some embodiments, the foaming can be carried out at a temperature which is around the melting temperature of the polymer. In some embodiments, the foaming can be carried out at a temperature of from about 70° C., or about 80° C., or about 90° C., or about 100° C., to about 110° C., or about 120° C., or about 130° C., or about 140° C., or about 150° C.

In some embodiments, the foaming can be carried out at a pressure of from about 10 Bar, or about 20 Bar, or about 30 Bar, or about 40 Bar, or about 50 Bar, or about 60 Bar, to about 100 Bar, or about 120 Bar, or about 150 Bar, or about 180 Bar, or about 200 Bar, or about 220 Bar. In an illustrative embodiment, the foaming can be carried out at a pressure ranged from about 50 Bar to about 200 Bar.

In some embodiments, the foamed beads can be conditioned (for example, at room temperature) to allow the gas exchange between inside and outside of the beads.

In some embodiments, the foam beads can have an average cell size of less than about 100 μm. In some embodiments, the foam beads can have an average cell size of from about 10 μm, about 15 μm, about 20 μm, to 80 μm, or 85 μm, or 90 μm, or 95 μm, or 100 μm.

It has been unexpectedly found that crosslinking before foaming results in improvement in elasticity. When the crosslinking is conducted before bead foaming (i.e. crosslinking of the micro-pellet before foaming, "pre-XL"), the energy loss (characterized by tan $\delta$ in dynamic mechanical analysis (DMA) of the resulting foamed beads can be significantly reduced compared with post-crosslinking approach (i.e. crosslinking of the foamed beads, "post-XL"). In other word, pre-XL can be one factor that is able to significantly enhance elasticity. This was especially true when such pre-XL bead foams had a gel content of ≥80%, especially ≥90% Such highly crosslinked, highly elastic bead foam may find promising potential use in bead-filling applications.

C. Foam Bead Filled Elements and Products

The present disclosure further provides an element prepared from the foam beads as described herein.

In some embodiments, the element can be a foam bead filled element. In some embodiments, the element can comprise a cavity filled with the foam beads as described. In some embodiments, the element can be prepared from the foam beads as described via bead-filling application. In some embodiments, the element can be prepared by (i) filling the foam beads as described into a cavity via a bead filling port of the cavity, and (ii) closing cavity, by, for example, closing all of the openings of the cavity including the bead filing port of the cavity. In some embodiments, the cavity can be a mold cavity. In some embodiments, the cavity can be of a predetermined shape. In some embodiments, the cavity can be made of inorganic and/or organic materials including fabrics, polymers, leather, rubber, fibers, and the like.

The present disclosure further provides a product comprising the element as described above. In some embodiments, the product can comprise a foam bead filling element as a part. Examples of the product can include but not limited to products for use in automotive parts, footwear components (such as midsoles), molded goods (such as toys or other household items), construction materials, etc.

The present disclosure further provides use of the foam beads as described herein in bead-filling applications.

EXAMPLES

Some embodiments of the invention will now be described in the following Examples, wherein all parts and percentages are by weight unless otherwise specified.

Raw Materials

- INFUSE™ D9130.05: olefin block copolymer (ethylene/octene multi-block copolymer), density 0.886 g/cm$^3$ (ASTM D792), MI 1.5 g/10 min (ASTM D1238, at 190° C./2.16 kg), Shore A=80 (ASTM D2240).
- Luperox 101 Peroxide: 2,5-dimethyl-2,5-di-(tert-butylperoxy) hexane from Arkema.
- XIAMETER OFS-6300: Vinyltrimethoxysilane (VTMS) from Dow Corning.
- DBTDL: dibutyl tin dilaurate, catalyst for silane moisture curing from Sinopharm Chemical Reagent Co., Ltd.
- n-Octyltriethoxysilane: solvent of DBTDL, from Sinopharm Chemical Reagent Co., Ltd.

Sample Preparation

Preparation of Silane-g-OBC Pellets

Silane-grafted INFUSE™ D9130.05 was prepared on a 40 mm diameter, 48 L/D 12-barrel ZSK-40 Coperion twin-screw extruder. The line was equipped with a 135 kW motor and had a maximum speed of 1200 rotations per minute (RPM). INFUSE™ D9130.05 was fed into the twin-screw extruder by loss in weight feeder. To prevent polymer oxidation, nitrogen was fed at the second barrel during the compounding process to sweep oxygen from the system. Melt discharge temperatures were measured using a hand-held thermocouple placed directly in the melt stream (Barrel set temperatures, from hopper to die, were 23/60/60/60/190/230/230/230/230/190/190/180° C.). A mixture of silane (XIAMETER OFS-6300) and peroxide (LUPEROX 101) was formed and injected through the liquid pump into the extruder at Barrel 6.

In order to minimize the concentration of volatile components and residual silane in the melt, a vacuum system was used to remove residual volatile components from the melt at barrel 11 in the process. A vacuum of 0.065-0.070 MPa was used.

An underwater pelletizer with a 16-hole die was used to produce compounded pellets. Twelve of the 16 holes were plugged to suppress the formation of pellet "chains" during pelletizing. A 6-blade pelletizing hub was used.

The obtained OBC had various grafted silane levels (0.36-2.93 wt %), based on the total weight of the silane-grafted ethylene/octene multi-block copolymer, as measured using Fourier transform infrared spectroscopy (FTIR) according to Chuanmei Jiao et al., Silane Grafting and Crosslinking of Ethylene-Octene Copolymer, 41 European Polymer J. 1204 (2005), the entire contents of which are incorporated herein by reference. Table 1 lists the information of the silane grafted resins.

TABLE 1

Silane-grafted INFUSE ™ D9130.05 pellets for preparing various bead foams.

| Pellets of silane grafted resin | Silane loading (%) | Silane grafting ratio (%) | For which examples |
|---|---|---|---|
| 1# | 0 | 0 | CE1 |
| 2# | 0.75 | 0.36 | CE2 |
| 3# | 1.0 | 0.68 | CE3 |
| 4# | 1.0 | 0.56 | CE4, CE5, CE6 |
| 5# | 1.5 | 1.08 | CE7, CE8, IE9, IE10 |
| 6# | 2 | 1.53 | CE11, CE12 |
| 7# | 4.0 | 2.93 | CE13 |

CE: Comparative example; IE: Inventive example

Crosslinking of Silane-g-OBC Pellets and Foamed Beads

Pre-crosslinking of silane grafted OBC micro-pellets was conducted in two ways:

(1) Soaking the pellets with catalyst solution of DBTDL in solvent n-Octyltriethoxysilane (DBTDL/n-Octyltriethoxysilane=3/10) at room temperature. 0.65 wt % of this catalyst solution (based on the weight of pellets) was placed into a sealable fluoro-plastic bottle, followed by adding the weighed silane grafted OBC micro-pellets. To ensure a homogenous distribution and complete soaking of the additives into the pellets, the bottle was first tumbled for 1 min and then placed on a running roller (Model No. 88881004, Thermo Scientific) for further homogenization. After soaking, the soaked pellets were exposed to air for moisture crosslinking for 7 days to make sure complete crosslinking of silane moieties.

(2) Immersing the silane grafted OBC micro-pellets into 85° C. water for several days for moisture crosslinking. The gel content was controlled by controlling the immersion time. The immersion crosslinking was stopped after reaching desired gel content.

Post-XL of foamed beads was carried out by the way (1).

Preparation of Foam Beads Through Auto-Clave Batch Foaming

The micro-pellets were fed into the auto-clave equipped with a heating unit and gas injection valve. The auto-clave was heated around the polymer melting temperature. At the same time, the blowing agent (high pressure $CO_2$ in this case) was injected into the clave for saturation (0.5~2 hours). The auto-clave pressure will vary depending on the polymer type. A typical range is like 50~200 bar. After the polymer was saturated with the $CO_2$ gas, a fast depressurization occurred and the foamed beads were prepared. The prepared foamed beads were usually conditioned at room temperature for several days to allow the gas exchange between inside and outside of the beads.

Performance Measurement (1) Gel Content

Gel content was obtained in the following manner. A specimen of pellets or beads was placed into a 120-mesh metallic mesh bag and boiled in 600 ml xylene for 5 hours. The total weight of pellets or beads in 600 ml xylene was about 2 g. After boiling for 5 hours, the mesh bags were taken out and dried in vacuum oven at 120° C. for 2 hours, and then weighed. The result was recorded in percent (%), based on the total weight of the material. The percent gel normally increases with increasing crosslinking levels.

(2) Foam Density

Density of the foam beads was measured by using water displacement method according to ASTM D792. The result was recorded in grams (g) per cubic centimeter (g/cc or g/cm$^3$).

(3) DMA Test for Energy Loss Characterization

Instrument:

RSA-G2, TA Instruments

Geometry: compression fixture, 15 mm disc

Method

Frequency sweep

Frequency: 0.1~100 rad/s

Temperature: 25° C.

Strain: 10%

Three specimens for each foamed bead example were tested and an average value at each frequency was used.

Results and Discussion (1) Foamability and Bead Properties

Bead foam examples were prepared from the micro-pellets of silane grafted INFUSE™ D9130.05 with various silane grafting level, as shown in Table 2. Crosslinking (XL) was carried out before (Pre-) and after (Post-)foaming. Pre means that the silane grafted pellets were XL by soaking catalyst and cured at RT (or immersing into hot water for curing) and then the XL pellets were foamed into beads. Post means that the silane grafted pellets were firstly foamed into beads and then the obtained beads were soaked with catalyst and cured at RT.

Table 2 gives the foaming temperature as well as density and gel content of the final foamed beads. The foaming temperature is related to the polymer Tm, molecular weight and degree of XL (i.e. gel content). If the temperature is too low, the polymer viscosity will be too high and thus the expansion ratio will be too low or even no expansion at all. If the temperature is too high, the pellets (non-XL or with low gel content) might be sticking to each other due to the melting of the crystalline phase of the polymer and thus fail to form free flowing beads. But for sufficiently XL pellets (i.e. with relatively high gel content), a relatively high foaming temperature will be needed to overcome the high melt strength induced by XL and obtain a high expansion ratio. As can be seen from Table 2, to achieve similar bead density, relatively higher foaming temperature was needed for the Pre-XL pellets compared with non-XL pellets. The higher gel content the pellets had, the higher foaming temperature was needed. This can be explained by the higher viscosity/melt strength caused by pre-XL. For the pellet of pristine INFUSE™ D9130.05 (CE1), it was found that it was difficult to reach a bead density below 0.17 g/cc. In this sense, silane grafting (reduced MI due to certain chain coupling) and Pre-XL improved the foamability of the pellets.

TABLE 2

Summary of foaming temperature and basic information of foamed beads

| Bead foam examples | Silane grafting ratio (%) | When cross-linking XL | Foaming temp (° C.) | Density of bead (g/cc) | Gel content (%) | Tanδ @0.1 rad/s | Tanδ @1 rad/s | Tanδ @10 rad/s |
|---|---|---|---|---|---|---|---|---|
| CE1 | 0 | Non | 100 | 0.175 | 0 | 0.191 | 0.168 | 0.133 |
| CE2 | 0.36 | Pre | 102 | 0.130 | 9.1 | 0.177 | 0.155 | 0.119 |
| CE3 | 0.68 | Pre* | 104 | 0.130 | 44.5 | 0.151 | 0.144 | 0.110 |
| CE4 | 0.56 | Pre | 108 | 0.075 | 69.6 | 0.154 | 0.138 | 0.103 |
| CE5 | 0.56 | Pre | 108 | 0.110 | 69.6 | 0.150 | 0.138 | 0.105 |
| CE6 | 0.56 | Pre | 108 | 0.135 | 69.6 | 0.154 | 0.142 | 0.109 |
| CE7 | 1.08 | Non | 99 | 0.140 | 1.4 | 0.154 | 0.146 | 0.118 |
| CE8 | 1.08 | Post | 99 | 0.130 | 100 | 0.125 | 0.122 | 0.099 |
| IE9 | 1.08 | Pre | 117 | 0.130 | 95.5 | 0.109 | 0.096 | 0.072 |
| IE10 | 1.08 | Pre | 117 | 0.155 | 95.5 | 0.111 | 0.098 | 0.073 |
| CE11 | 1.53 | Post | 100 | 0.157 | 100 | 0.127 | 0.127 | 0.104 |
| CE12 | 1.53 | Post | 100 | 0.172 | 100 | 0.130 | 0.130 | 0.108 |
| CE13 | 2.93 | Post | 101 | 0.184 | 100 | 0.109 | 0.115 | 0.095 |

*XL by immersing pellets into 85° C. water

All other XL was conducted by soaking catalyst into pellets or bead foam at room temperature.

DMA test was used to characterize tan δ (i.e. energy loss) of foamed beads during compression. Lower tan δ means less energy loss and better elasticity. Good elasticity and low energy loss is very important in bead-filling application.

As shown in Table 3, the same silane grafted (1.08% grafting ratio) pellets were made into different foamed beads: CE7, non-XL, gel content 1.4%; CE8, post-XL, gel content 100%; IE9, pre-XL, gel content 95.5%. These examples had very similar foam density. Their DMA results tan δ at typical frequency: 0.1, 1.0 and 10 rad/s are given in Table 3. The tan δ curves during frequency sweep (0.1-10 rad/s) were depicted in FIG. 1, where more tan δ values are available for further comparison.

Clearly, XL (Pre- or Post-) beads had lower tan δ than non-XL ones (CE7 and CE1), which conformed to a common sense that XL is able to reduce energy loss for a POE foam. However, what was surprising was that pre-XL bead (IE9) had significantly lower tan δ than post-XL (CE8) one (although the post-XL one had even a little higher gel content). IE10 used the same 1.08% silane grafted pellet and made a foamed bead with a relatively high density. Still, the tan δ was significantly lower than the post-XL CE8. These results demonstrated that Pre-XL approach could significant enhance the elasticity of foamed beads versus post-XL approach.

In CE11 and CE13, much higher silane grafted micro-pellets were foamed into beads and then post-XL. The resulting gel content was 100% as well, but the crosslinking density should definitely be higher than CE8 and IE9 as the catalyst DBTDL could catalyze XL of almost all silane in a sufficient time period. It is well known that higher cross-linking density normally leads to better elasticity. However, IE9 and IE10 still had lower tan δ than CE11 and CE13, which further demonstrated the effectiveness of elasticity improvement by pre-XL (vs. post-XL). The foam densities of some examples were not very close. Please be noted that foamed density in the study range had minor effect on the tan δ, as discussed below.

TABLE 3

Effect of Pre-XL and Post-XL on the Tanδ of bead foam

| Examples | Silane grafting ratio (%) | How to XL | Gel content (%) | Density of bead (g/cc) | Tanδ @0.1 rad/s | Tanδ @1 rad/s | Tanδ @10 rad/s |
|---|---|---|---|---|---|---|---|
| CE1 | 0 | Non | 0 | 0.175 | 0.191 | 0.168 | 0.133 |
| CE7 | 1.08 | Non | 1.4 | 0.140 | 0.154 | 0.146 | 0.118 |
| CE8 | 1.08 | Post | 100 | 0.130 | 0.125 | 0.122 | 0.099 |
| IE9 | 1.08 | Pre | 95.5 | 0.130 | 0.109 | 0.096 | 0.072 |
| IE10 | 1.08 | Pre | 95.5 | 0.155 | 0.111 | 0.098 | 0.073 |
| CE11 | 1.53 | Post | 100 | 0.157 | 0.127 | 0.127 | 0.104 |
| CE13 | 2.93 | Post | 100 | 0.184 | 0.109 | 0.115 | 0.095 |

Although pre-XL led to effective reduction of tan δ, the examples in Table 4 further indicated that relatively high gel content was required. Generally, tan δ decreases with the increase of gel content. However, the change was not linear. As seen from CE2, CE3 and CE6, no significant decrease of tan δ was observed with significantly increasing gel content. However, for IE9 with a higher gel content (95.5%), a much lower tan δ was achieved. Therefore, it is believed that a sufficiently high gel content is critical to result in very low tan δ, i.e. good elasticity.

TABLE 4

Effect of gel content level on the Tanδ of Pre-XL bead foam

| Examples | How to XL | Gel content (%) | Density of bead (g/cc) | Tanδ @0.1 rad/s | Tanδ @1 rad/s | Tanδ @10 rad/s |
|---|---|---|---|---|---|---|
| CE1 | Non | 0 | 0.175 | 0.191 | 0.168 | 0.133 |
| CE2 | Pre | 9.1 | 0.130 | 0.177 | 0.155 | 0.119 |
| CE3 | Pre | 44.5 | 0.130 | 0.151 | 0.144 | 0.110 |
| CE6 | Pre | 69.6 | 0.135 | 0.154 | 0.142 | 0.109 |
| IE9 | Pre | 95.5 | 0.130 | 0.109 | 0.096 | 0.072 |

In some examples above, tan δ comparison was made between foamed beads of different densities. It is important to understand if bead density itself is significant factor influencing tan δ and decouple it from other factors (pre-XL vs. post-XL, gel content). In Table 5, three sets of examples were studied, where the silane grafting ratio, how to XL and gel content was the same for the examples in each set. No significant different tan δ was found for the examples in each set, indicating that the bead density in the range (~0.07-0.17 g/cc) was not a major factor affecting tan δ.

TABLE 5

Effect of bead foam density on tan Tanδ

| Examples | Silane grafting ratio (%) | How to XL | Gel content (%) | Density of bead (g/cc) | Tanδ @0.1 rad/s | Tanδ @1 rad/s | Tanδ @10 rad/s |
|---|---|---|---|---|---|---|---|
| CE4 | 0.56 | Pre | 69.6 | 0.075 | 0.154 | 0.138 | 0.103 |
| CE5 | 0.56 | Pre | 69.6 | 0.110 | 0.150 | 0.138 | 0.105 |
| CE6 | 0.56 | Pre | 69.6 | 0.135 | 0.154 | 0.142 | 0.109 |
| IE9 | 1.08 | Pre | 95.5 | 0.130 | 0.109 | 0.096 | 0.072 |
| IE10 | 1.08 | Pre | 95.5 | 0.155 | 0.111 | 0.098 | 0.073 |
| CE11 | 1.53 | Post | 100 | 0.157 | 0.127 | 0.127 | 0.104 |
| CE12 | 1.53 | Post | 100 | 0.172 | 0.130 | 0.130 | 0.108 |

(2) Morphology of Foamed Beads

Figure 2:
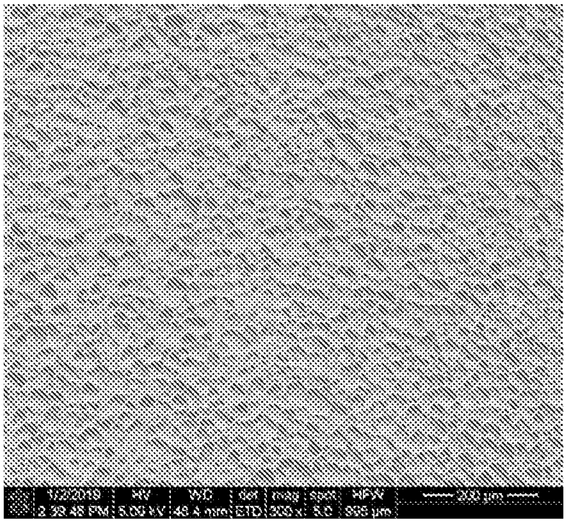
FIG. 2 is a scanning electron microscope (SEM) micrograph of the foam beads prepared in the Examples.
Figure 2:
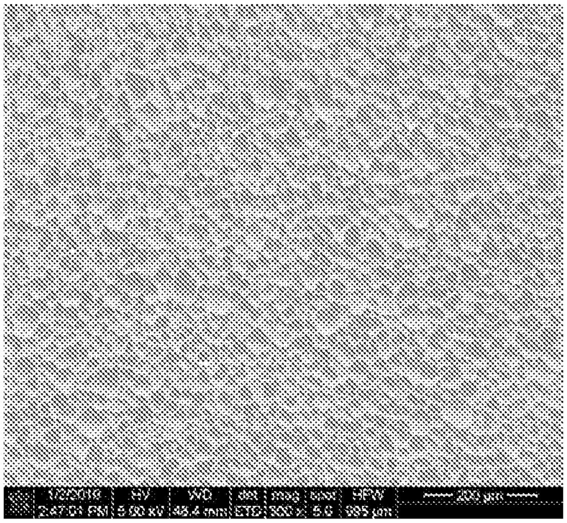
Figure 2:
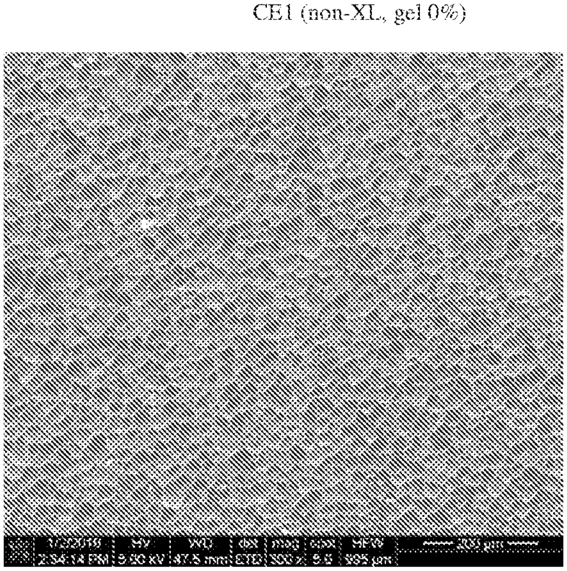
Figure 2:
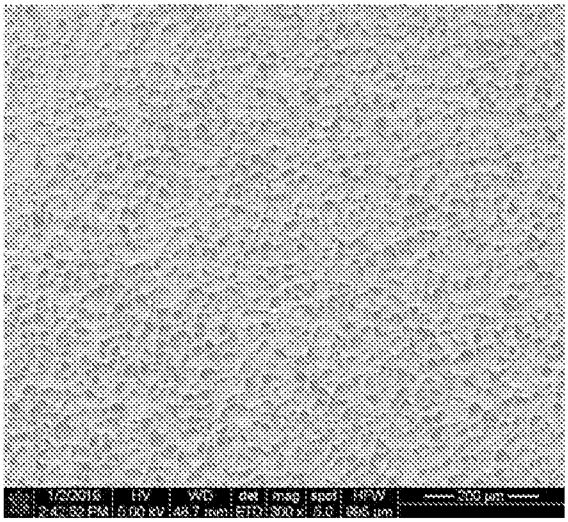

FIG. 2 shows the cell morphology of the foamed beads. The cell size of these samples was comparable. All the foams had a uniform cell size less than 100 micron.

In summary, the highly crosslinked polyolefin interpolymer (OBC) bead foams have much better elasticity than non-XL ones. Pre-XL can help make foamed beads with significantly enhanced elasticity compared with the ones made through post-XL approach. The preferred gel content is ≥80%, more preferred ≥90%. Such highly crosslinked bead foam is promising for bead-filling application.

What is claimed is:

1. A foam bead formed from a composition comprising one or more silane-grafted polyolefin interpolymers, wherein the foam bead has a gel content of higher than 95%, and a tan δ at 1 rad/s of lower than or equal to 0.11, and a tan δ at 10 rad/s of lower than or equal to 0.09, and a tan δ at 0.1 rad/s of lower than or equal to 0.12; and wherein the one or more silane-grafted polyolefin interpolymers are one or more silane-grafted ethylene/C3-C20 alpha-olefin multi-block copolymers; and wherein each silane-grafted ethylene/C3-C20 alpha-olefin multi-block copolymer has a silane grafting ratio from 0.8 wt % to 1.2 wt % based on the total weight of the silane-grafted ethylene/C3-C20 alpha-olefin multi-block copolymer; and wherein the foam bead is formed from the composition by crosslinking pellets of the composition prior to foaming the pellets.

2. The foam bead according to claim 1, wherein each silane-grafted ethylene/C3-C20 alpha-olefin multi-block copolymer has the silane grafting ratio from 1.0 wt % to 1.2 wt %, based on the total weight of the silane-grafted ethylene/C3-C20 alpha-olefin multi-block copolymer.

3. The foam bead according to claim 1, wherein the foam bead is foamed at a temperature from 70° C. to 120° C.

4. The foam bead according to claim 1, wherein the one or more silane-grafted ethylene/C3-C20 alpha-olefin multi-block copolymers are formed from ethylene/C3-C20 alpha-olefin multiblock copolymers that have a density from 0.865 to 0.890 g/cc.

* * * * *